United States Patent
Kato

(10) Patent No.: US 9,407,611 B2
(45) Date of Patent: Aug. 2, 2016

(54) NETWORK SYSTEM, MANAGEMENT SERVER SYSTEM, CONTROL METHOD, AND STORAGE MEDIUM FOR TENANT TRANSITION

(71) Applicant: CANON KABUSHIKI KAISHA, Tokyo (JP)

(72) Inventor: Kazunori Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 14/491,287

(22) Filed: Sep. 19, 2014

(65) Prior Publication Data
US 2015/0095651 A1    Apr. 2, 2015

(30) Foreign Application Priority Data
Sep. 27, 2013 (JP) ................. 2013-202264

(51) Int. Cl.
| H04L 29/06 | (2006.01) |
| H04L 29/08 | (2006.01) |
| H04L 12/24 | (2006.01) |

(52) U.S. Cl.
CPC .......... *H04L 63/0457* (2013.01); *H04L 41/046* (2013.01); *H04L 63/062* (2013.01); *H04L 67/025* (2013.01); *H04L 63/126* (2013.01)

(58) Field of Classification Search
CPC . H04L 63/062; H04L 67/025; H04L 41/0813; H04L 63/0457; H04L 63/126
See application file for complete search history.

(56) References Cited

U.S. PATENT DOCUMENTS

| 2003/0033521 A1* | 2/2003 | Sahlbach ................ 713/156 |
| 2007/0283155 A1* | 12/2007 | Kato ..................... 713/171 |
| 2009/0323954 A1* | 12/2009 | Sprunk et al. ........... 380/259 |
| 2010/0235688 A1* | 9/2010 | Bennah et al. ........... 714/57 |
| 2010/0287377 A1* | 11/2010 | Lim ..................... 713/176 |
| 2011/0289571 A1* | 11/2011 | Yasuhara ................. 726/7 |
| 2012/0159587 A1* | 6/2012 | Ge et al. ................. 726/6 |
| 2013/0191629 A1* | 7/2013 | Treinen et al. ........... 713/153 |

FOREIGN PATENT DOCUMENTS

| JP | 2004-054633 A | 2/2004 |
| JP | 2006-099741 A | 4/2006 |

* cited by examiner

Primary Examiner — Don Zhao
(74) Attorney, Agent, or Firm — Carter, DeLuca, Farrell & Schmidt, LLP

(57) ABSTRACT

Provided is a management server system that accepts a transition instruction for transition between tenants of an agent device, generates symmetric keys consisting of a first key and a second key, responds the second key to the agent device, and verifies signature information included in a transition request using the first key when the agent device makes a tenant transition request. Upon successful verification of signature information, the management server system transmits new authentication information for communication between the management server system and the agent device to the agent device. After transition of the tenant, the agent device communicates with the management server system using the new authentication information.

12 Claims, 19 Drawing Sheets

FIG. 9

| Customer ID (801) | Customer name (802) | Agent registration code (803) | Transition confirmation code (804) | |
|---|---|---|---|---|
| AA | AA Company | 456237 | 123456 | ~811 |
| BB | BB Company | 938472 | 456789 | ~812 |
| CC | CC Contractor | 275237 | 987654 | ~813 |

FIG. 10

| Customer ID (1301) | Agent ID (1302) | Device ID (1303) | IP address (1304) | |
|---|---|---|---|---|
| AA | QWE | QWE1234 | 172.24.111.112 | ~1311 |
| BB | ASD | TYU2819 | 192.21.22.222 | ~1312 |
| BB | RTY | SFD2982 | 192.21.21.121 | ~1313 |

FIG. 11A

| Customer ID (901) | Agent ID (902) | Authentication key (903) | |
|---|---|---|---|
| AA | QWE | 1qazxsw2 | ~911 |

FIG. 11B

| Customer ID (901) | Agent ID (902) | Authentication key (903) | |
|---|---|---|---|
| BB | ASD | cde34rfv | ~921 |
| BB | RTY | 9ijnbgt5 | ~922 |

FIG. 11C

| Customer ID (901) | Agent ID (902) | Authentication key (903) | |
|---|---|---|---|
| AA | QWE | 1qazxsw2 | ~911 |
| AA | ASD | zse4xdr5 | ~912 |
| AA | RTY | cdr5tfvg6 | ~913 |

FIG. 12

| Customer ID 1101 | Device ID 1102 | Job type 1103 | Start time 1104 | End time 1105 | The number of page(s) 1106 | Document name 1107 |
|---|---|---|---|---|---|---|
| AA | QWE1234 | Copy | 2009/9/25 14:25 | 2009/9/25 14:40 | 4 | 1111 |
| AA | QWE1234 | Print | 2009/9/26 9:01 | 2009/9/26 9:10 | 1 | a. doc 1112 |
| AA | QWE1234 | Copy | 2009/9/26 9:10 | 2009/9/26 9:10 | 5 | 1113 |
| BB | TYU2819 | Print | 2009/9/26 10:12 | 2009/9/26 10:13 | 10 | p.pdf 1114 |

FIG. 13A

| Customer ID | Agent ID | Transition destination customer ID | Transition key A | Transition key B | Expiration date | Successful transition time | Transition time |
|---|---|---|---|---|---|---|---|
| BB | ASD | AA | 1qaz2wsx | bgt5nhy6 | 2012/07/01 12:01 | 2012/07/03 03:41 | 2012/07/04 03:41 |
| BB | RTY | AA | 3edc4rfv | 6yhn7ujm | 2012/07/01 12:02 | 2012/07/02 02:42 | 2012/07/04 03:41 |

FIG. 13B

| Customer ID | Agent ID | Transition source customer ID | Transition key A | Expiration date |
|---|---|---|---|---|
| AA | ASD | BB | 1qaz2wsx | 2012/07/01 12:01 |
| AA | RTY | BB | 3edc4rfv | 2012/07/01 12:02 |

FIG. 14

| Belonging customer ID 1201 | Agent ID 1202 | Authentication key 1203 | Transition destination customer ID 1204 | Transition key B 1205 | Post-transition authentication key 1206 | Transition date and time 1207 |
|---|---|---|---|---|---|---|
| BB | ASD | cde34rfv | | | | | ← 1211
| BB | ASD | cde34rfv | AA | bgt5nhy6 | | | ← 1212
| BB | ASD | cde34rfv | AA | bgt5nhy6 | zse4xdr5 | 2012/07/01 12:01 | ← 1213

US 9,407,611 B2

NETWORK SYSTEM, MANAGEMENT SERVER SYSTEM, CONTROL METHOD, AND STORAGE MEDIUM FOR TENANT TRANSITION

BACKGROUND OF THE INVENTION

1. Field of the Invention

The present invention relates to a network system including a management server system that manages a plurality of devices registered in tenant units and a device management agent that relays the devices and the management server system.

2. Description of the Related Art

There have been proposed device management services that register a device such as a peripheral device or a printer, manage the registered peripheral device via a network, and provide services. Some device management services are used by a service provider (device management service provider) to manage devices of a plurality of customers (individual people and companies). Such device management services secure a data region for each customer and register and manage devices for each customer.

There have been proposed systems in which a server for providing a device management service is disposed in the cloud of Internet. In such systems, a device management agent is disposed in a customer network environment or a device management agent function is implemented in a device so as to enable a relay between the device management server and the device. For example, the device management service and the device management agent communicate with the device management server via HTTP/HTTPS or the like. The device management agent communicates with the device management server, receives work instructions, and transmits device information.

The device management agent is managed in association with a customer which is managed by the device management server. The device management agent receives an authentication key for the device management agent upon registration processing for registering a device into the device management server, and uses the authentication key for authentication when communicating with the device management server. In the device management server, the device management agent authentication key is managed for each customer and is managed in a data region for each customer.

For example, Japanese Patent Laid-Open No. 2006-99741 discloses a document management server that associates each of devices and documents with a group to which each of the devices and documents belongs and manages them so as to restrict the devices which are capable of outputting the documents. For example, Japanese Patent Laid-Open No. 2004-54633 discloses a system which associates IP addresses of a plurality of terminals such as mobile phones, PDAs, PCs, automobiles, and the like with user identification information and manages them so as to enable a terminal switching operation by information synchronization via Internet.

In the device management services described above, two or more customers may be integrated into one customer due to an integration of customer companies or the like. In this case, device management information managed by the device management agent which is the transition source needs to be transitioned from a transition source customer to a transition destination customer and the device management agent needs to be redisposed/reset. For example, in order to register the device management agent into the transition destination customer, software for the device management agent needs to be reinstalled so as to perform a re-registration operation for the transition destination customer. Thus, a service provider SE needs to visit a customer company to perform an operation.

Upon transition of the device management agent between customers, the device management agent authentication key held by the device management agent needs to be newly issued so as to safely realize a key exchange between the transition destination customer and the device management agent.

SUMMARY OF THE INVENTION

The present invention provides a network system that realizes safe transition between agent's customers only when the user specifies the transition destination to the device management server without operating the device management agent which is in a customer's network environment.

According to an aspect of the present invention, a network system is provided that includes a management server system that manages a plurality of network devices; and an agent device that is provided in a site network including the plurality of network devices and communicates with the management server system. The management server system includes an accepting unit configured to accept a transition instruction for transition from a first tenant to a second tenant of the agent device; a generating unit configured to generate symmetric keys consisting of a first key and a second key in response to the transition instruction; a managing unit configured to manage identification information about the agent device and the generated first key by associating them with the second tenant serving as a transition destination; a responding unit configured to respond information about the second tenant serving as the transition destination and the generated second key to a query from the agent device; a verifying unit configured to, upon reception of a transition request for transition to the second tenant, verify signature information included in the transition request using the first key which is managed in association with the second tenant; and a transmitting unit configured to, upon successful verification of the signature information, transmit new authentication information for communication between the management server system and the agent device to the agent device. The agent device includes a querying unit configured to send a query to the management server system; a receiving unit configured to receive a response; a requesting unit configured to transmit a transition request for transition to the second tenant, which includes signature information using the second key included in the response, to the management server system in accordance with the response; and a storing unit configured to store new authentication information, which has been transmitted from the management server system in accordance with successful verification of the signature information, in association with the second tenant.

Further features of the present invention will become apparent from the following description of exemplary embodiments with reference to the attached drawings.

BRIEF DESCRIPTION OF THE DRAWINGS

FIG. 9 illustrates an example of a customer management table managed by the device management server.

FIG. 10 illustrates an example of a device management table managed by the device management server.

FIGS. 11A to 11C illustrate examples of agent management tables managed by the device management server.

FIG. 12 illustrates an example of a job history information table managed by the device management server.

FIGS. 13A and 13B illustrate examples of transition management tables managed by the device management server.

FIG. 14 illustrates an example of an authentication key/transition information storage table managed by the agent.

DESCRIPTION OF THE EMBODIMENTS

First Embodiment

Overall Configuration of System

Figure 1:
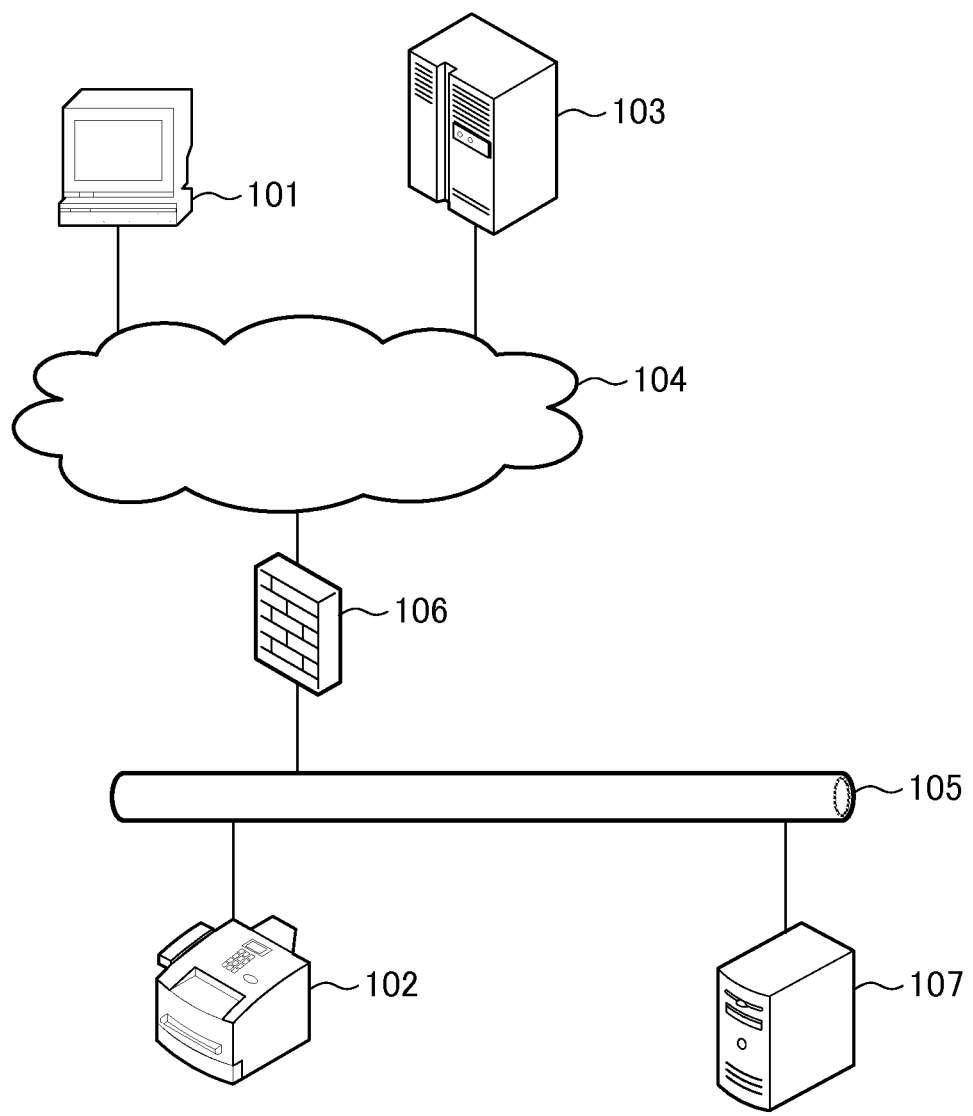
FIG. 1 is a diagram illustrating an example of an overall configuration of a network system according to the present embodiment.

The network system shown in FIG. 1 according to one embodiment of the present invention includes a management terminal 101, a peripheral device 102, a device management server 103, and a device management agent 107 (hereinafter also simply referred to as "agent"). A network 104 is a network configured by a known technique such as Internet. The management terminal 101 is a personal computer or the like operated by a service provider user and is connected to the network 104. Although there are a customer network and a firewall between the management terminal 101 and the network 104, the customer network and firewall are not illustrated in FIG. 1.

The device management server 103 manages the peripheral device 102 for each of a plurality of customers or in tenant units. The device management server 103 is disclosed on the network 104 and is communicable with the management terminal 101, the peripheral device 102, and the device management agent 107. While only one device management server 103 is shown in FIG. 1, the device management server 103 functions as a device management server system that is constituted by a management server, a storage server, and the like on the Internet.

The peripheral device 102 is network device that is communicable with a host computer (not shown) and the agent device 107. The peripheral device 102 is a multi-function peripheral, a printer, or the like that receives print data from, for example, a host computer via a customer network 105 and then prints the print data on a sheet using a known printing technique such as an electrophotographic technique, an inkjet technique, or the like. The peripheral device 102 may also be a multi-function peripheral having functions of reading a paper original via, for example, a scanner, copying the paper original, and transmitting image data via an Email or the like by converting the paper original into image data.

The device management agent 107 is an agent device that communicates with the peripheral device 102 instead of the device management server 103 and collects information such as a job log from the peripheral device 102 so as to control the peripheral device 102. The device management agent 107 is provided in a site network including one or a plurality of peripheral devices 102. The peripheral device 102 and the device management agent 107 are connected to the customer network 105 such as LAN, and are connected to the network 104 via a firewall 106. Thus, communication transmitted from the management terminal 101 and the device management server 103 which are connected to the network 104 is rejected by the firewall 106. Thus, the communication to the peripheral device 102 and the device management agent 107 cannot be established from the management terminal 101 and the device management server 103.

In the above network system, the service provider user operates the management terminal 101, accesses the device management server 103, and registers and manages the peripheral device 102 which is managed for each customer. Then, the service provider user refers to information about the peripheral device 102 which is managed for each customer and instructs the peripheral device 102 to execute a control command. The device management agent 107 communicates with the device management server 103 at regular intervals, checks whether or not the service provider user has instructed the peripheral device 102 to execute the control command, and receives the control command if there is an instruction. Upon execution of the control command, the device management agent 107 collects information about the peripheral device 102 or changes the operational settings of the peripheral device 102 using the SNMP protocol or the like.

[Configuration of the Device Management Server 103]

Figure 2:
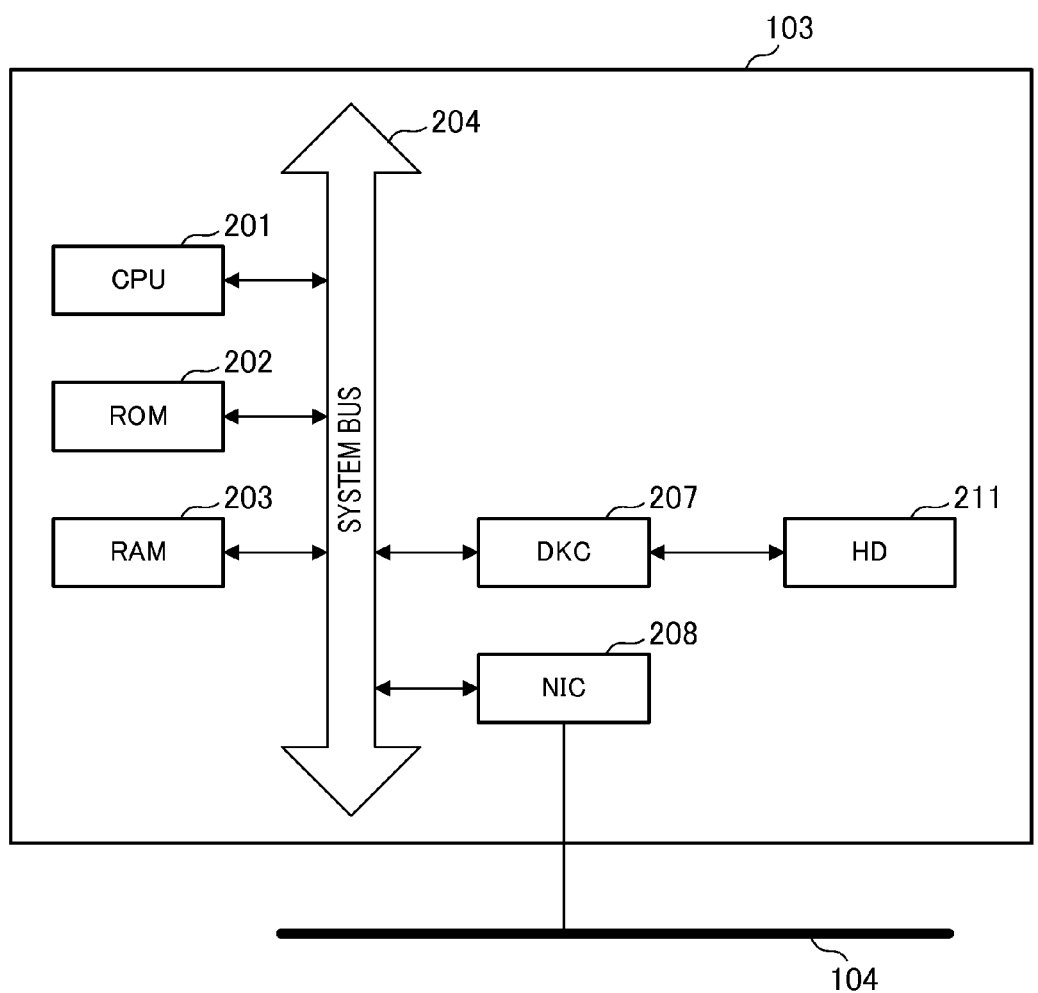
FIG. 2 is a diagram illustrating an example of a hardware configuration of a device management server.

FIG. 2 is a diagram illustrating an example of a hardware configuration of the device management server 103. The device management server 103 includes a CPU 201, a ROM 202, a RAM 203, a DKC 207, an NIC 208, and an HD 211. The CPU 201 realizes various types of processing to be described in the following embodiments by executing software stored in the ROM 202 or the hard disk (HD) 211 which is a mass storage device. The CPU 201 integrally controls each of the devices connected to a system bus 204. The RAM 203 functions as a main memory, a work area, or the like of the CPU 201. The disk controller (DKC) 207 controls the hard disk (HD) 211. The network interface card (NIC) 208 bi-directionally exchanges data with another node via the network 104. A firewall (not shown) may also be provided between the network card 208 and the network 104.

Figure 3:
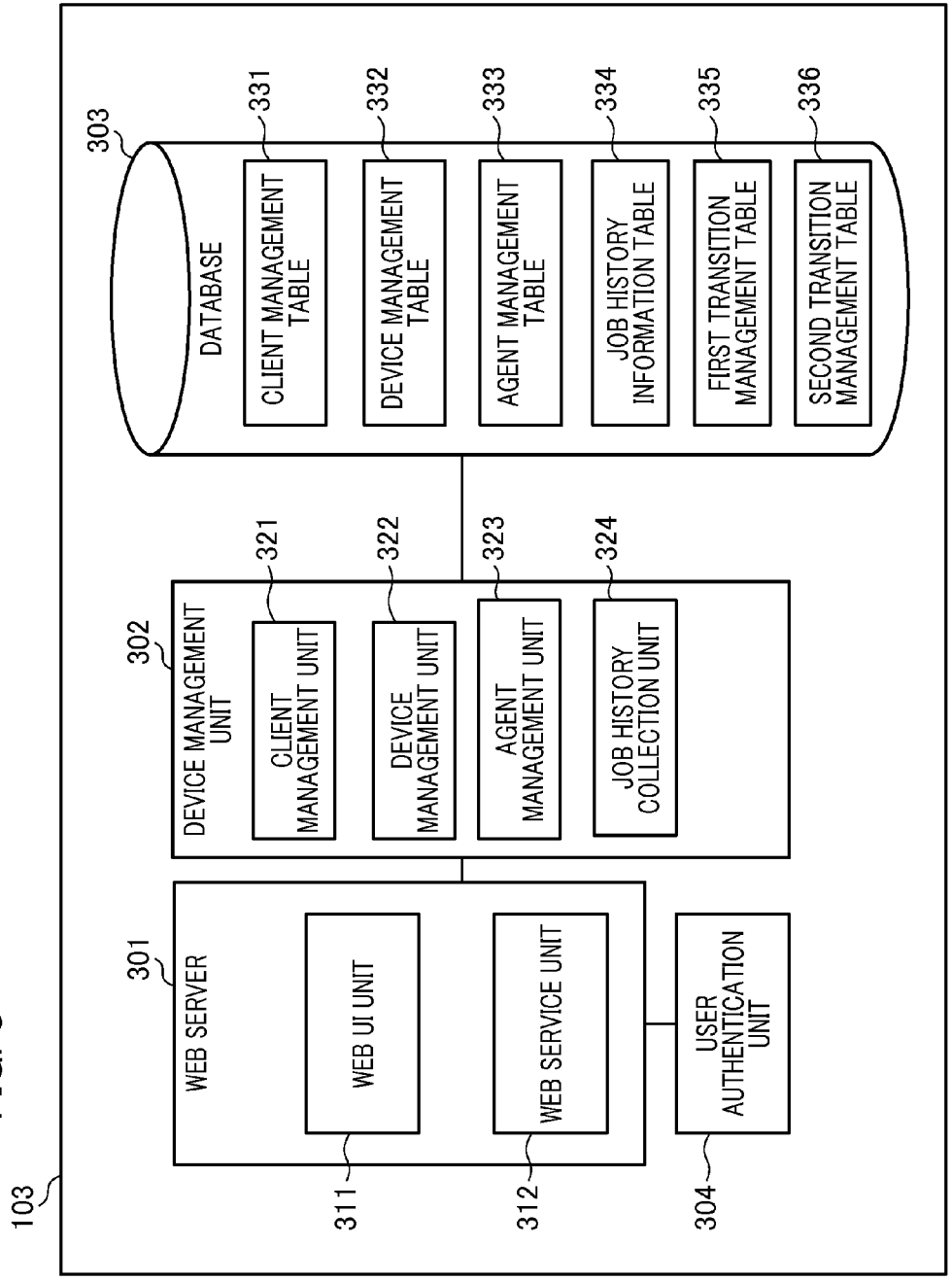
FIG. 3 is a diagram illustrating an example of a functional configuration of the device management server.

FIG. 3 is a diagram illustrating an example of a functional configuration of the device management server 103. The device management server 103 includes a Web server unit 301, a device management unit 302, a database 303, and a user authentication unit 304. The Web server unit 301 is a Web server that receives an HTTP request or an HTTPS request from the management terminal 101 and the peripheral device 102 via the NIC 208 and the network 104 and returns a response to the received request, thereby providing a service.

The Web server unit 301 includes a Web UI unit 311 and a Web service unit 312. The Web UI unit 311 receives the HTTP request from a Web browser 701 of the management terminal 101 and associates with the user authentication unit 304. When the user authentication unit 304 performs a successful user authentication, the Web UI unit 311 responds HTML data to the Web browser 701. The Web service unit 312 receives a Web service request such as SOAP or REST from the agent 107, and returns a response such as XML data to the agent 107.

When no authentication token is set to the HTTP request made from the Web browser 701, the user authentication unit 304 determines that an access is made from an unauthenticated user, and returns HTML of a log-in screen. The Web browser 701 displays the log-in screen. When authentication information such as a user ID, a password, or the like is input by a user's operation, the Web browser 701 transmits authentication information to the device management server 103. When the combination of a user ID and his password is correct upon reception of authentication information, the user authentication unit 304 determines that authentication has succeeded, issues and sets an authentication token to a cookie or the like, and instructs the Web UI unit 311 to redirect to the requested screen. Upon being redirected to the requested screen, the Web UI unit 311 generates HTML of the requested screen and transmits the HTML back to the Web browser 701.

The device management unit 302 includes a customer management unit 321, a device management unit 322, an agent management unit 323, and a job history collection unit 324. The customer management unit 321 manages customers registered in the device management server 103. The device management unit 322 manages information about the peripheral device 102 registered for each customer. The agent management unit 323 controls registration processing for registering the agent 107 in the device management server 103 and transition processing for transition to another customer of the agent. Upon registration of the agent 107, the agent management unit 323 also performs control for safely passing an authentication key to the agent 107. When the Web service unit 312 receives a request from the agent 107, the agent management unit 323 performs agent authentication processing.

The job history collection unit 324 receives job history from the agent 107 via the Web service unit 312, and stores the received job history in a job history information table 334 (FIG. 14) to be described below with reference to FIG. 14. Upon reception of job history, the Web service unit 312 acquires a customer ID, an agent ID, and signature information, which are added to the HTTP header portion of the HTTP request, and passes them to the agent management unit 323. The agent management unit 323 acquires an authentication key which is in association with the acquired customer ID and agent ID from the agent management table 333 to be described below with reference to FIG. 10, and then creates signature information about the HTTP message. When the created signature information matches the signature information acquired from the HTTP header, the request is authenticated as a request made from a correct agent. Then, when the agent management unit 323 transfers the HTTP message to the job history collection unit 324, the job history collection unit 324 acquires job history information from the HTTP message, and stores the job history information in the job history information table 334.

The database 303 includes a customer management table 331, a device management table 332, an agent management table 333, a job history information table 334, a first transition management table 335, and a second transition management table 336. A description will be given of information managed by the tables with reference to FIGS. 9 to 14.

FIG. 9 illustrates data stored in the customer management table 331. The customer management table 331 is a table for managing customers registered in the device management server 103. A customer ID 801 is an ID for uniquely identifying a customer within the system. A customer name 802 is the customer's name used when the customer is displayed on a web browser or the like of the management terminal 101. The agent registration code 803 is a value used for uniquely identifying a customer upon registration of the device management agent 107 to the customer. In the present embodiment, the agent registration code 803 is a numerical value. A transition confirmation code 804 is a code for specifying the transition destination customer together with the customer ID upon transition of the agent. For example, a row 811 indicates a customer whose customer ID is "AA", whose customer name is an "AA company", whose agent registration code is "456237", and whose delegation confirmation code is "123456".

FIG. 10 illustrates data stored in the device management table 332. The device management table 332 is a table for managing a device registered for each customer in the device management server 103. A customer ID 1301 is an ID for identifying a customer and is associated with the customer ID 801 managed in the customer management table 331. An agent ID 1302 is an ID for identifying the device management agent 107. A device ID 1303 is an ID for identifying a peripheral device. The table indicates the fact that the device management agent 107 identified by the agent ID 1302 manages the peripheral device identified by the device ID 1303. An IP address 1304 is a network address for communicating with a peripheral device. The agent uses the IP address 1304 to communicate with a peripheral device.

For example, a row 1311 indicates the fact that the customer having the customer ID of "AA" is registered with the peripheral device which is associated with the agent having the agent ID of "QWE" and has the device ID of "QWE1234". Information about peripheral devices registered in customers having the customer ID of "BB" is registered in rows 1312 and 1313. When a table is separately managed for each customer, the row 1311 having the customer ID of "AA" and the rows 1312 and 1313 having the customer ID of "BB" are stored in different tables having the same structure.

FIGS. 11A to 11C illustrate data stored in the agent management table 333. The agent management table 333 is a table for managing an agent(s) registered for each customer in the device management server 103. The agent management table 333 manages authentication information different for each agent device by associating them with each other in tenant units. A customer ID 901 is an ID for identifying a customer and is associated with the customer ID 801 managed in the customer management table 331. An agent ID 902 is an ID for identifying the device management agent 107. An authentication key 903 is a key for a signature for authenticating an agent managed by the device management server 103. For example, a row 911 indicates the fact that the customer having the customer ID of "AA" is registered with the agent having the agent ID of "QWE" and having the authentication key of "1qazxsw2".

When the agent belonging to the customer having the customer ID of "BB" shown in FIG. 11B is transitioned to the customer having the customer ID of "AA", the table shown in FIG. 11A is updated to the table shown in FIG. 11C. As shown in FIG. 11C, the agent having the agent ID of "ASD" and the agent having the agent ID of "RTY" are transitioned to the customer having the customer ID of "AA". The device management server 103 generates a new authentication key for each agent upon transition of an agent, stores the new authentication key in the agent management table 333, and transmits the generated authentication key to the agent. Upon reception of a successful transition notification from the agents (ASD, RTY), the device management server 103 deletes customer information about the transition source and its authentication key. In the example shown in FIGS. 11A to 11C, the table shown in FIG. 11B is deleted.

FIG. 12 illustrates data stored in the job history information table 334. A customer ID 1101 is an ID for identifying a customer. A device ID 1102 is an ID for identifying a peripheral device. A job type 1103 is, for example, printing data from a host computer, copying, scanning, faxing, and box printing a document stored in the peripheral device. A start time 1104 is a time at which the processing of the job has started, and an end time 1105 is a time at which the processing of the job has ended. The number of page(s) processed by the relevant job is recorded in a number of page(s) 1106. Upon printing a job consisting of four pages, the number of pages "4" is recorded. A document name 1107 is a document name set to a job by a print application for the relevant job. A job history information table held by the job history management unit 504 of the peripheral device has the table structure shown in FIG. 12 with the customer ID 1101 and the device ID 1102 removed therefrom. A job history information table held by the job history management unit 805 of the agent has the table structure shown in FIG. 12 with the customer ID 1101 removed therefrom.

FIG. 13A illustrates data stored in the first transition management table 335. The first transition management table 335 is a table for storing transition information required for the transition source customer when the device management server 103 transitions the agent to another customer. A customer ID 1001 is an ID for identifying the transition source customer and is associated with the customer ID 801 managed in the customer management table 331. An agent ID 1002 stores an ID of an agent targeted for transition.

A transition destination customer ID 1003 is an ID of the transition destination customer to which an agent is transitioned. A transition key A 1004 and a transition key B 1005 are symmetric keys for encryption. Upon generation of the symmetric keys, the agent management unit 323 stores the symmetric keys in the transition source customer table, i.e., the first transition management table 335. Data encrypted with the transition key A can be decrypted with the transition key B, and data encrypted with the transition key B can be decrypted with the transition key A. Upon performing transition processing, the transition source customer distributes the transition key A to the transition destination customer and the transition key B to the agent targeted for transition, and the transition destination customer and the agent targeted for transition use the transition key A and the transition key A, respectively, for authentication.

An expiration date 1006 indicates the expiration date of transition processing. When the agent transition processing is not succeeded before the expiration date, it is judged that agent transition has failed. A successful transition time 1007 is a time at which transition to the transition destination customer of the agent 107 has been succeeded and the successful transition notification has been received from the agent 107. A transition time 1008 indicates a time at which the agent switches a transmission destination to which device information, job history information, and the like from the transition source customer to the transition destination customer after successful transition to the transition destination customer of the agent 107.

For example, a row 1011 indicates the fact that the agent having the agent ID of "ASD" registered in the customer having the customer ID of "BB" has been transitioned to the customer having the customer ID of "AA". The row 1011 also indicates the fact that the transition key A is "1qaz2wsx", the transition key B is "bgt5nhy6", the expiration date is "2012/07/01 12:01", the successful transition time is "2012/07/03 03:41", and the transition time is "2012/07/04 03:41".

FIG. 13B illustrates data stored in the second transition management table 336. The second transition management table 336 is a table for storing transition information required for the transition destination customer when the device management server 103 transitions the agent to another customer. A customer ID 1101 is an ID for identifying the transition destination customer and is associated with the customer ID 801 managed in the customer management table 331. An agent ID 1102 stores an ID of an agent targeted for transition. A transition source customer ID 1103 is an ID of the transition source customer from which an agent is transitioned. A transition key A 1104 is a key for encryption which is sent from the transition source customer. As described above, the second transition management table 336 manages identification information about an agent device and a generated single key by associating them with the transition destination customer. An expiration date 1106 indicates the expiration date of transition processing. When the agent transition processing is not succeeded before the expiration date, it is judged that agent transition has failed.

Figure 4:
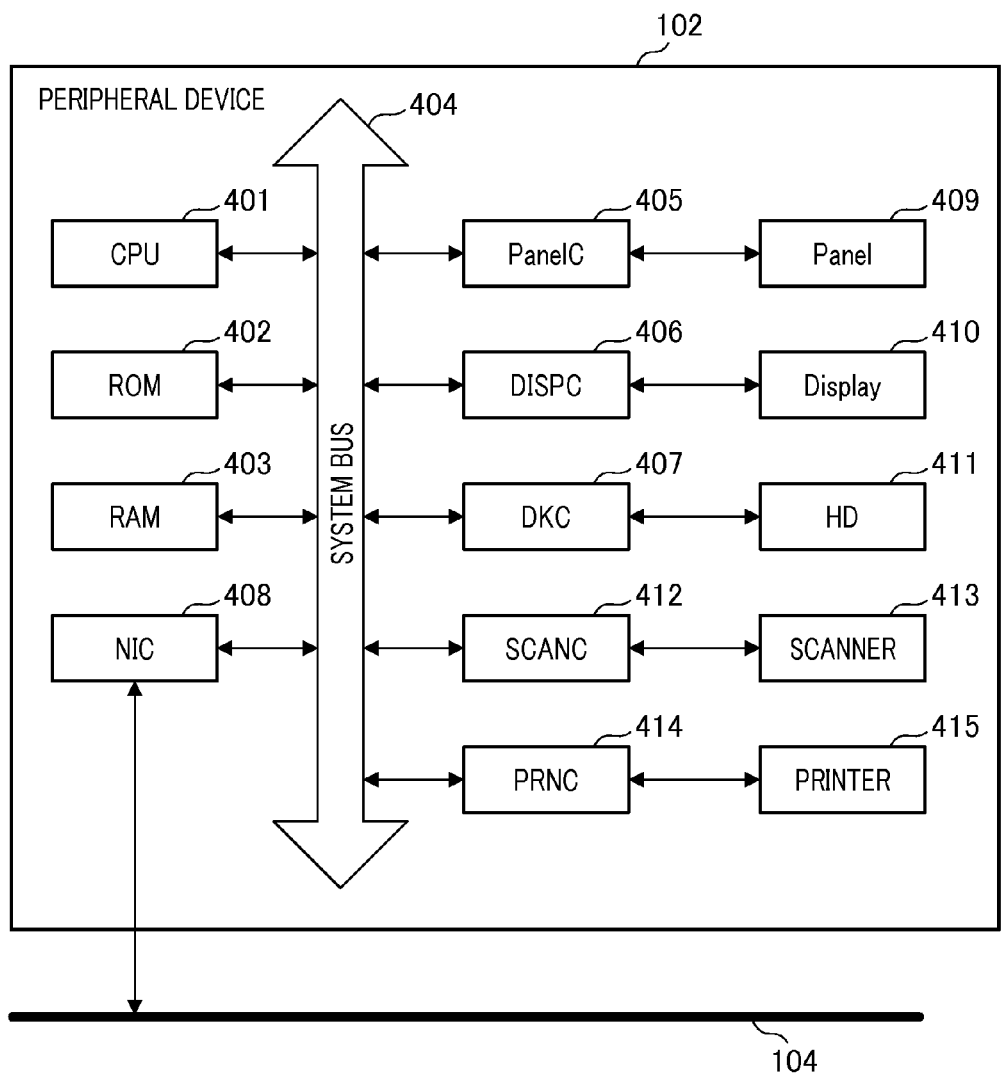
FIG. 4 is a diagram illustrating an example of a hardware configuration of a peripheral device.

FIG. 4 is a diagram illustrating a hardware configuration of the peripheral device 102. The peripheral device 102 includes a CPU 401, a ROM 402, a RAM 403, a panel controller 405, a display controller 406, a disk controller 407, a network interface card 408, an operation panel 409, a display module 410, a hard disk 411, a scanner controller 412, an optical scanner 413, a printer controller 414, and a printer 415. The CPU 401 executes software stored in the ROM 402 or the hard disk 411 which is a mass storage device so as to integrally control each of the devices connected to the system bus 404. The RAM 403 functions as a main memory, a work area, or the like of the CPU 401.

The panel controller (PanelC) 405 controls an instruction input from the operation panel 409 provided in the peripheral device 102. The display controller (DISPC) 406 controls display of the display module (DISPLAY) 410 constituted by, for example, a liquid crystal display. The disk controller (DKC) 407 controls the hard disk (HD) 411 which is a mass storage device. The network interface card (NIC) 408 exchanges data with another node via the network 104. The scanner controller (SCANC) 412 controls the optical scanner 413 provided in the peripheral device 102 to read a paper original. The printer controller (PRNC) 414 controls the printer 415 provided in the peripheral device 102 to print data on a sheet using a known printing technique such as the electrophotographic technique or the inkjet technique.

Figure 5:
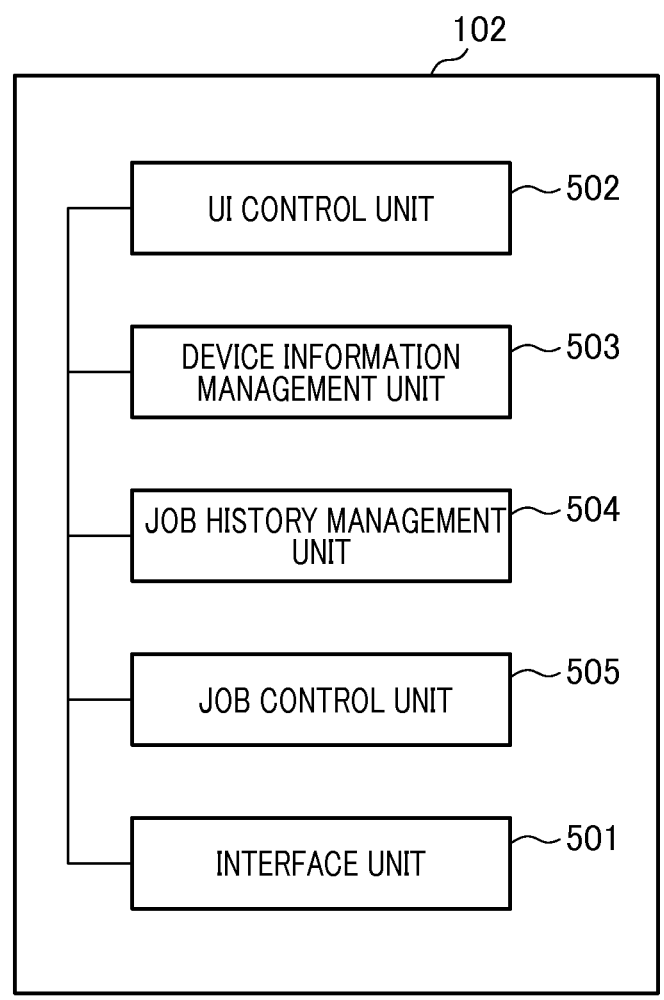
FIG. 5 is a diagram illustrating an example of a functional configuration of the peripheral device.

FIG. 5 is a diagram illustrating an example of a functional configuration of the peripheral device 102. The peripheral device 102 includes an interface unit 501, a UI control unit 502, a device information management unit 503, a job history management unit 504, and a job control unit 505. The interface unit 501 is connected to the network 104, receives a print job from a host computer (not shown), and communicates with the agent 107. The UI control unit 502 controls the display module 410 via the display controller (DISPC) 406 to display a screen for receiving a copy instruction. The UI control unit 502 also controls the operation panel 409 via the panel controller 405, and accepts a user's copy instruction given to the peripheral device 102 to generate a copy job.

The job control unit 505 receives a print job received by the interface unit 501 and a copy job generated by the UI control unit 502 to execute the jobs. The job control unit 505 controls the printer controller 407 or the scanner controller 412 depending on the content of a job to execute the job. Upon start or end of execution of a job, the job content and the results of execution are recorded as history in the job history management unit 504. The device information management unit 503 manages setting information and configuration information about the peripheral device 102, and responds the specified information in response to the information acquisition request made from another configuration module. An example of information managed by the device information management unit 503 includes a serial number.

Figure 6:
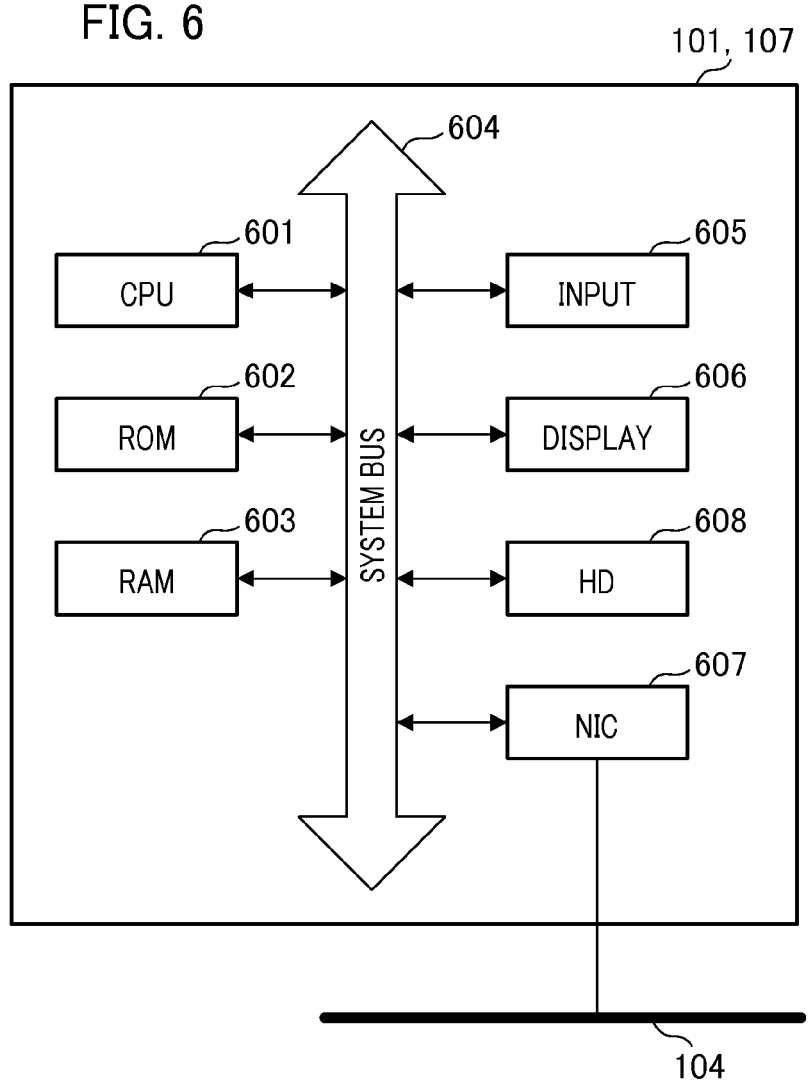
FIG. 6 is a diagram illustrating an example of a hardware configuration of a management terminal and an agent.

FIG. 6 is a diagram illustrating an example of a hardware configuration of the agent 107 and the management terminal 101. Each of the management terminal 101 and the agent 107 includes a CPU 601, a ROM 602, a RAM 603, an input device 605, a display module 606, a network interface card 607, and an HD 608. The CPU 601 realizes various types of processing to be described in the following embodiments by executing software stored in the ROM 602 or the HD 608 which is a mass storage device. The CPU 601 integrally controls each of the devices connected to a system bus 604. The RAM 603 functions as a main memory, a work area, or the like of the CPU 601.

The input device (INPUT) 605 is a keyboard, a mouse, a touch panel, a button, and/or the like, and provides an input unit to a user's operation. The display module (DISPLAY) 606 is a display module constituted by a liquid crystal display or the like. The network interface card (NIC) 607 bi-directionally exchanges data with another node via the network 104.

Figure 7:
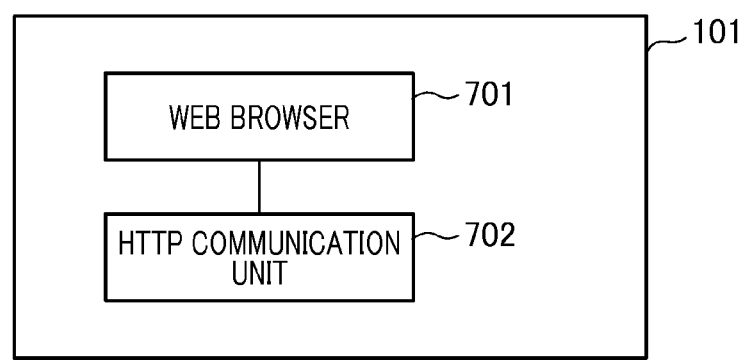
FIG. 7 is a diagram illustrating an example of a functional configuration of the management terminal.

FIG. 7 is a diagram illustrating an example of a functional configuration of the management terminal 101. The management terminal 101 includes a Web browser 701 and an HTTP communication unit 702. The Web browser 701 specifies a URL, transmits an information acquisition request to the HTTP communication unit 702, and acquires HTML data. The Web browser 701 interprets the HTML data acquired by using the HTTP communication unit 702, and performs screen rendering to the display module 606. The Web browser 701 also receives a user's operation applied to a control in the displayed screen from the input device 605, and transmits a request to the HTTP communication unit 702 in response to the operation content.

The HTTP communication unit 702 receives a communication request from the web browser 701, communicates with a web server via an image processing apparatus and the like, and the NIC 607 with use of a protocol such as HTTP or HTTPS, requests a web page, and receives Web page data. The service provider user specifies the URL of the device management server 103 on the Web browser 701 of the management terminal 101 and accesses the Web server 301, so that the service provider user can use the functions of the device management server 103.

Figure 8:
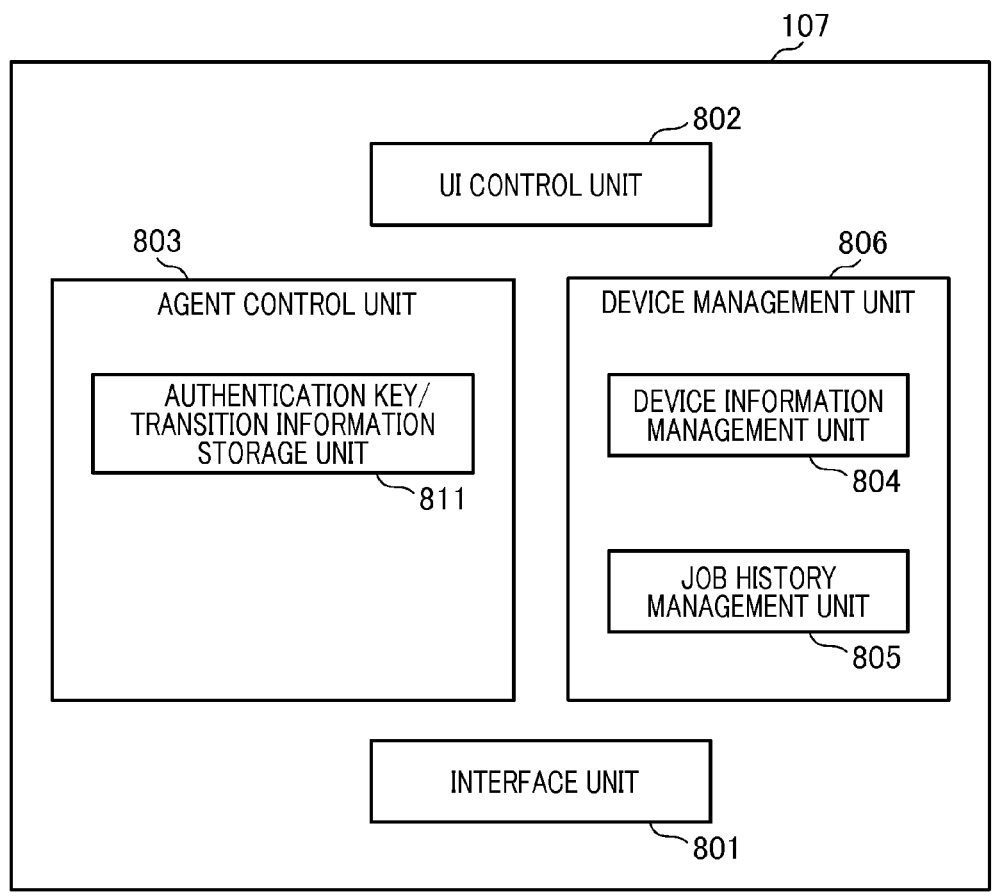
FIG. 8 is a diagram illustrating an example of a functional configuration of the agent.

FIG. 8 is a diagram illustrating an example of a functional configuration of the device management agent 107. The agent 107 includes an interface unit 801, a UI control unit 802, an agent control unit 803, and a device management unit 806. The interface unit 801 uses the NIC 607 to communicate with the peripheral device 102 and the device management server 103 via a network. The UI control unit 802 controls the input device 605 and the display module 606 to perform screen display and receives a user's operation applied to a control in the displayed screen from the input device 605. The UI control unit 802 transmits a user instruction to the agent control unit 803 and the device management unit 806 in response to the operation content, and displays the results of processing on the display module 606 to notify the service provider user of the results.

The agent control unit 803 includes an authentication key/transition information storage unit 811 and controls registration of the agent 107 in the device management server 103 and agent transition processing between customers. When the UI control unit 802 detects that the user has provided an agent registration instruction to the device management server 103, the UI control unit 802 notifies the agent control unit 803 of the detection. The device management unit 806 acquires a list of peripheral devices to be managed by the relevant agent from the device management server 103 via the interface unit 801. The device management unit 806 collects information from the acquired peripheral devices to be managed via the interface unit 801, and transmits the collected information to the device management server 103. A device information management unit 804 acquires setting information and configuration information from the device information management unit 503 of the peripheral device 102, and transmits the setting information and configuration information to the device management server 103. A job history management unit 805 acquires job history information managed by the job history management unit 504 of the peripheral device 102, and transmits the job history information to the device management server 103.

FIG. 14 illustrates data stored in the authentication key/transition information storage unit 811. A belonging customer ID 1201 is the identifier of a customer to which the agent 107 belongs. An agent ID 1202 is the identifier of an agent in the device management server 103. An authentication key 1203 is a signature key for authenticating the agent 107 by the device management server 103 upon establishment of communication between the agent 107 and the device management server 103. A transition destination customer ID 1204 is a transition destination customer's identifier which is passed when a customer transition instruction has received from the device management server 103.

A transition key B 1205 is an encryption key which is passed when a customer transition instruction has received from the device management server 103 and is used for transition processing. The transition key B 1205 is used for verifying a transition destination customer and for verifying an agent targeted for transition. A post-transition authentication key 1206 is an authentication key which is passed from a transition destination customer upon successful transition processing for transition to the transition destination customer. A transition date and time 1207 is a date and time at which transition instructed by a transition source customer is performed upon successful transition processing for transition to the transition destination customer. The agent control unit 803 is connected to the transition source customer before the transition date and time 1207 and is connected to the transition destination customer after the transition date and time 1207.

The authentication key 1203 is generated by the device management server 103 for each agent and is passed to the agent 107. When the agent 107 acquires an authentication key after successful registration in the device management server 103, the agent 107 creates signature data using the authentication key upon subsequent communication, and transmits communication data to which signature data and an agent's identifier (agent ID) have been appended to the device management server 103. Upon reception of communication data from the agent 107, the device management server 103 creates signature data using an authentication key (903) of the relevant agent 107 and it is judged that authentication has succeeded when the created signature data matches the signature data appended to the communication data.

[Agent Registration Processing Flow]

Figure 15:
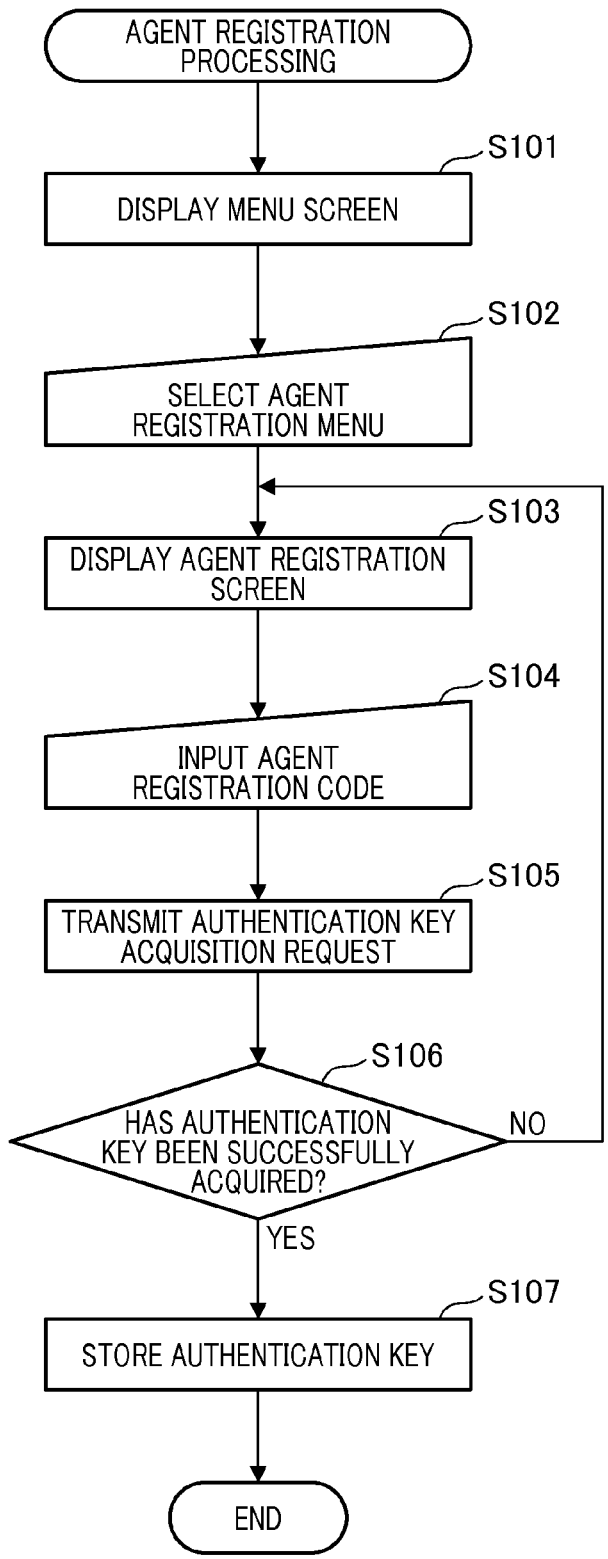
FIG. 15 is a flowchart illustrating the flow of agent registration processing.
Figure 16:
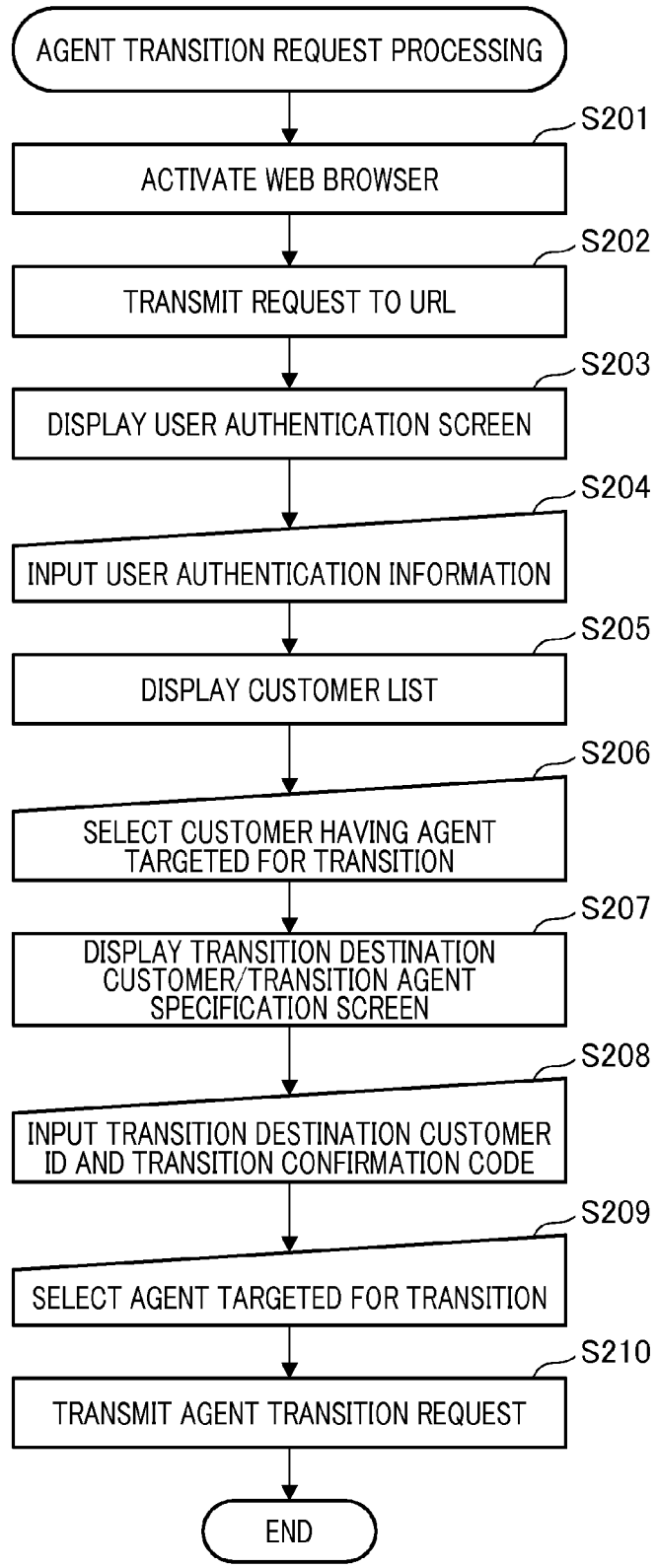
FIG. 16 is a flowchart illustrating the flow of agent transition request processing.

Next, a description will be given of the flow of processing for registering an agent in the device management server 103 after installation of the agent with reference to FIG. 15. Firstly, in step S101, the agent 107 communicates with the device management server 103 by a user's operation, receives a menu screen (not shown), and displays it on the display 606. In step S102, the user selects an "agent registration" menu on the displayed menu screen using the input device 605 such as a mouse or a keyboard. When the agent 107 detects that the "agent registration" menu has been selected by the input device 605, the agent 107 displays an agent registration screen (not shown) on the display module 606 in step S103. The agent registration screen has an [agent registration code] input control and a [register] button for instructing agent registration.

Next, in step S104, the user confirms the agent registration code of a customer to which an agent is to be registered from the customer management table 331 (FIG. 9) managed by the device management server 103. Then, the user inputs the agent registration code to an [agent registration code] input code and presses the [register] button. In step S105, the agent control unit 803 of the agent 107 generates an agent ID such as GUID, and transmits an authentication key acquisition request including the agent ID and the input agent registration code to the device management server 103. In the case of a configuration in which the agent manages one peripheral device, the agent ID may be the serial No. of the peripheral device. The device management server 103 may also generate an installer for a software module of an agent to which an agent ID being unique in the system is assigned so as to download the software module.

Upon reception of an authentication key acquisition request by the device management server 103, the agent management unit 323 searches for a customer in which the agent registration code 803 in the customer management table 331 shown in FIG. 9 matches the received agent registration code. When a customer who matches the received agent registration code is present, the agent management unit 323 generates an authentication key for the relevant agent, and registers a record in the agent management table for the relevant customer. For example, when the agent having the agent ID of "ASD" is registered for the customer having the customer ID of "BB" and the authentication key is "cde34rfv", the record is as shown in the row 921 in FIG. 11B. Then, the device management server 103 transmits a successful registration notification together with the generated authentication key and the customer ID to the agent 107. When the agent registration key 803 which matches the received agent registration key is not found in the customer management table 331, the device management server 103 transmits a registration-failed notification to the agent 107.

In step S106, the agent control unit 803 of the agent 107 judges whether or not the authentication key has been successfully acquired. If unsuccessful, the processing returns to step S103, and the agent control unit 803 requests the user to input the agent registration key again. If successful, the processing proceeds to step S107, and the agent control unit 803 stores the received authentication key in the authentication key/transition information storage unit 811 and the agent registration processing ends. When the customer ID of the customer to which the agent has been registered is "BB", the agent ID is "ASD", and the authentication key is "cde34rfv", the report registered in the authentication key/transition information storage unit 811 is as shown in the row 1211 in FIG. 14.

[Job History Transmission Processing]

The job history management unit 805 of the agent 107 acquires and stores job history information executed by the peripheral device 102, and transmits the job history information to the device management server 103 via the interface unit 501 at regular intervals. Upon transmission of a job history, the job history management unit 805 acquires the authentication key 1203 from the authentication key/transition information storage unit 811, generates signature information about the HTTP message for job history transmission using the authentication key, and adds the signature information to the HTTP header together with the customer ID and the agent ID. Signature information is generated by using an algorithm such as SHA.

When the device management server 103 receives a job history transmission message from the job history management unit 805 of the agent 107, the agent management unit 323 performs agent authentication processing using the HTTP message and information about the HTTP header. During agent authentication processing, the agent management unit 323 firstly acquires the customer ID, the agent ID, and signature information from the HTTP header. Next, a row which matches the agent ID specified by the HTTP header is searched from the agent management table 333 for the customer specified by the customer ID of the HTTP header so as to acquire the authentication key 903 for the relevant row. When the relevant row is absent, it is judged that authentication has failed.

Next, the agent management unit 323 generates signature information about the HTTP message using the authentication key 903 for the relevant row, and compares it with signature information acquired from the HTTP header. If matched, it is judged that authentication has succeeded, whereas if not matched, it is judged that authentication has failed. If authentication has succeeded, the job history collection unit 324 of the device management server 103 stores the received job history in the job history information table 334 for the customer specified by the customer ID of the HTTP header.

[Agent Transition Processing Flow]

Next, a description will be given of processing for transition of an agent from the registered customer to another customer with reference to FIGS. 16 to 22. Firstly, a description will be given of the agent transition request processing shown in FIG. 16. In step S201, the service provider user activates the Web browser 701 on the management terminal 101. In step S202, the service provider user specifies the URL of the device management server 103 and transmits an agent transition screen display request to the device management server 103.

Upon reception of the screen display request, the device management server 103 verifies the request. If the request is in an unauthenticated state, the device management server 103 generates HTML of the user authentication screen and transmits the HTML back to the Web browser 701 in step S203. The Web browser 701 draws the HTML of the received user authentication screen.

In step S204, when the service provider user inputs user authentication information on the displayed user authentication screen, the Web browser 701 transmits the input user authentication information to the device management server 103. The user authentication unit 304 of the device management server 103 verifies the received user authentication information so as to verify whether or not the user is legitimate. If authentication has succeeded, the device management server 103 acquires a customer information list from the customer management table 331, generates the agent transition screen HTML including the customer information list, and transmits the agent transition screen HTML to the Web browser 701. The Web browser 701 displays the agent transition screen including the customer list received in step S205.

In step S206, when the service provider user selects a customer including an agent targeted for transition from the customer list on the agent transition screen, the Web browser 701 transmits the selected customer to the device management server 103. The device management server 103 acquires an agent information list from the agent management table 333 for the specified customer, generates HTML of the transition destination customer/transition agent specification screen shown in FIG. 22, and transmits the HTML to the Web browser 701. Next, in step S207, the Web browser 701 displays the transition destination customer/transition agent specification screen.

(Transition Destination Customer/Transition Agent Specification Screen)

Figure 22:
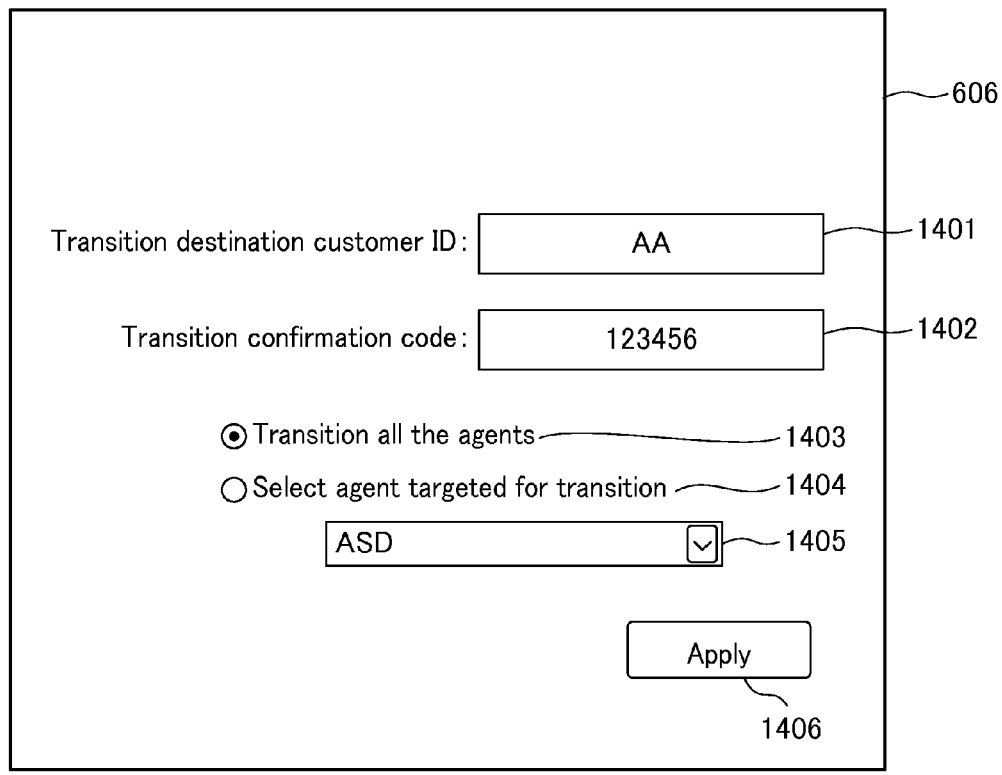
FIG. 22 illustrates an example of a transition destination customer/transition agent specification screen.

FIG. 22 illustrates an example of a transition destination customer/transition agent specification screen displayed on the Web browser 701. A transition destination customer ID 1401 is an input control for specifying a transition destination customer to which an agent is to be transitioned. A transition confirmation code 1402 is an input control for specifying an agent transition confirmation code. The transition confirmation code 1402 is stored in the transition confirmation code 804 of the customer management table 331, is generated upon registration of a customer in the device management server 103, and is displayed together with the customer ID on the customer list screen (not shown). The service provider user confirms the customer ID of the transition destination customer and the transition confirmation code on the customer list screen, and inputs them to the input control of the transition destination customer ID 1401 and the transition confirmation code 1402, respectively.

Reference numerals 1403 and 1404 indicate control for selecting whether all the agents registered to the transition source customer are transitioned or an agent targeted for transition is selected. Reference numeral 1405 indicates control for selecting an agent targeted for transition if a selection has been made by the control 1404 to select an agent targeted for transition. A button 1406 is an "apply" button for confirming the input. Upon pressing the "apply" button 1406, the agent transition request is transmitted to the device management server 103.

Referring back to FIG. 16, in step S208, the service provider user inputs the customer ID of the transition destination customer to the transition destination customer ID 1401 and inputs the transition confirmation code to the transition confirmation code 1402. Next, in step S209, an agent targeted for transition is selected via controls 1403, 1404, and 1405. Upon pressing the "apply" button 1406 in step S210, the Web browser 701 transmits the agent transition request to the device management server 103 based on the input information.

[Agent Transition Request Processing by the Device Management Server 103]

Figure 17:
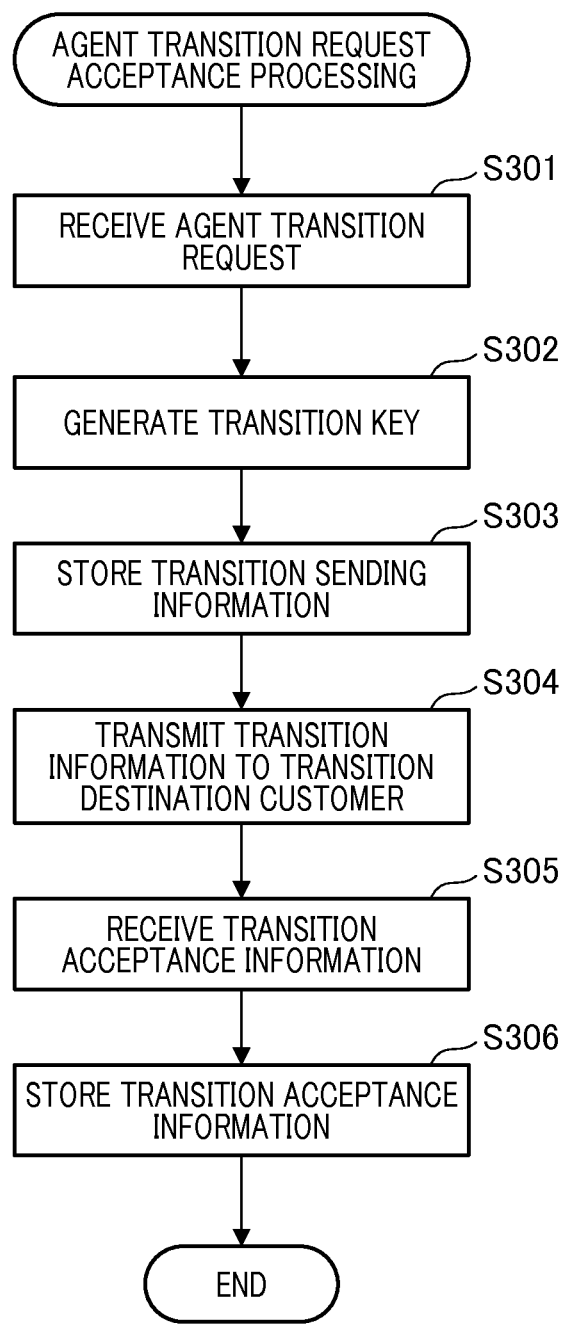
FIG. 17 is a flowchart illustrating the flow of agent transition request acceptance processing.

FIG. 17 illustrates the flow of agent transition request processing executed by the agent management unit 323 of the device management server 103. In step S301, upon reception of the agent transition request transmitted from the Web browser 701 of the management terminal 101, the Web service unit 312 of the device management server 103 transmits the request to the agent management unit 323.

Next, in step S302, the agent management unit 323 generates a transition key for each agent targeted for transition. When the [transition all agents] 1403 has been selected on the transition destination customer/transition agent specification screen, the agent management unit 323 acquires a list of agents for the transition source customer of interest from the agent management table 333 and generates transition keys for each agent. The transition keys are a pair of keys consisting of symmetric keys. Data encrypted with one transition key A can be decrypted with the other transition key B. Data encrypted with the transition key B can be decrypted with the transition key A.

Next, in step S303, the agent management unit 323 creates transition sending information for each agent targeted for transition, and stores the transition sending information in the first transition management table 335. When the [transition all agents] 1403 has been selected as shown in FIG. 22, the agent management unit 323 sets transition sending information as the row 1011 and the row 1012 shown in FIG. 13A. The agent management unit 323 specifies the transition source customer ID 1001 as "BB", the agent ID 1002 as "ASD", and the transition destination customer ID as "AA". The agent management unit 323 sets the transition keys A and B generated in step S302 to the transition key A 1004 and the transition key B 1005, respectively, and sets a time, which is obtained by adding a predetermined time to a time at which the transition instruction has been received, as the expiration date 1006.

In step S304, the agent management unit 323 transmits transition information to the transition destination customer AA. Next, in step S305, the agent management unit 323 receives transition acceptance information from the transition destination customer AA, and in step S306, the agent management unit 323 stores the transition acceptance information in the second transition management table 336 for the transition destination customer. Transition information transmitted to the transition destination includes a transition destination customer ID, an agent ID targeted for transition, a transition source customer ID, a transition key A, and an expiration date, which are stored by associating them with items corresponding to reference numerals 1101 to 1106 in the second transition management table 336. Here, while, in the present embodiment, transition information is transmitted to a terminal or the like used by the transition destination customer and the table shown in FIG. 13B is stored upon reception of transition acceptance information, the present invention is not limited thereto. Transmission to the transition destination customer may also be logically performed in the agent management unit 323. When the device management server 103 is present in plural, transition information may also be transmitted to the agent management unit 323 of the device management server 103 on which the transition destination customer is managed via the network.

[Transition Request Processing by the Agent 107]

Figure 18:
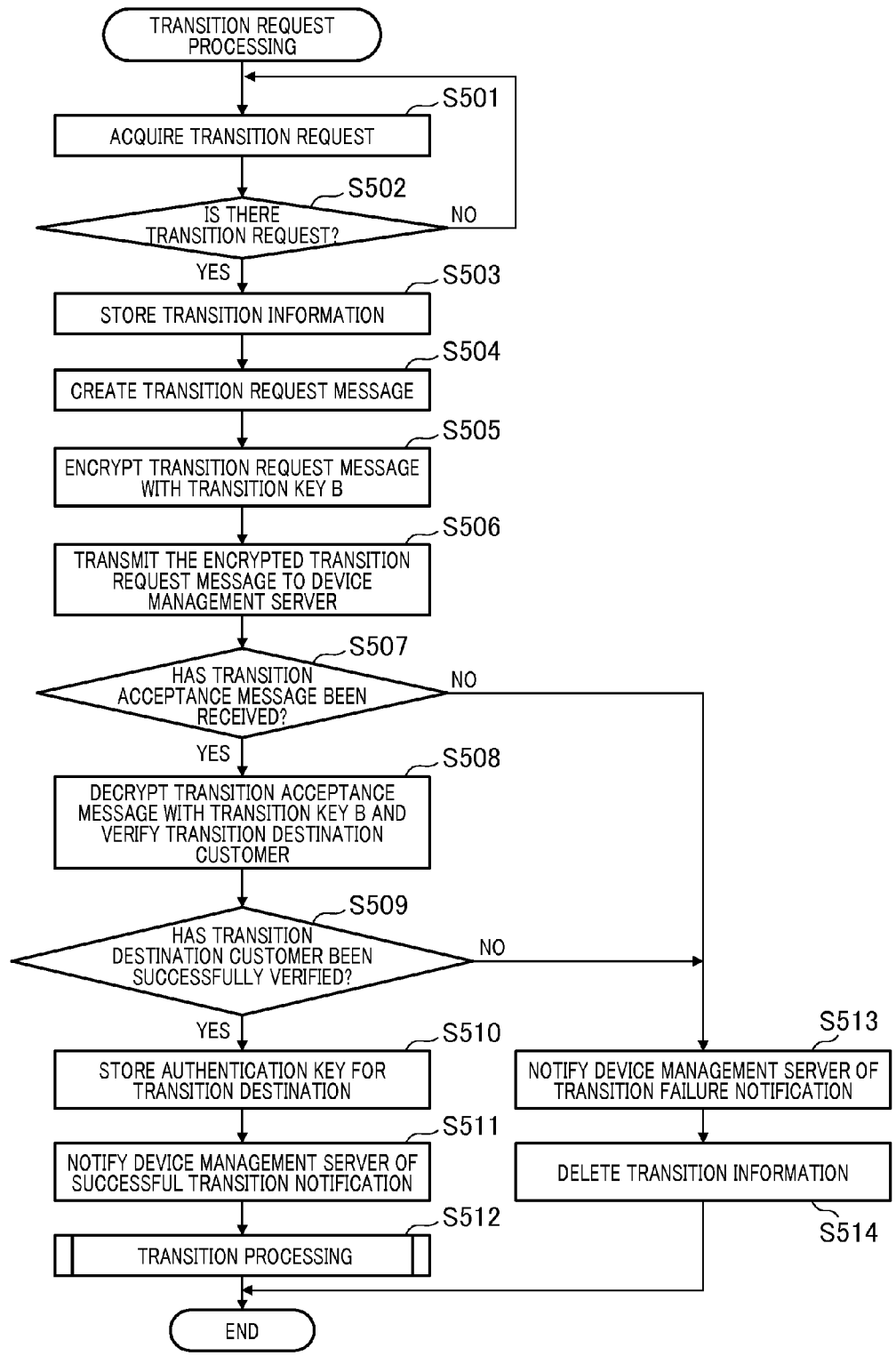
FIG. 18 is a flowchart illustrating the flow of transition request processing.

A description will be given of transition request processing executed by the agent 107 with reference to FIG. 18. In steps S501 and S502, the agent control unit 803 of the agent 107 acquires a transition request from the device management server 103 at regular intervals. When there is no transition request, the agent control unit 803 makes an attempt to acquire a transition request again after waiting for a predetermined time. When there is a transition request, the processing proceeds to step S503, and the transition request processing is performed.

Upon reception of the transition request acquisition request from the agent 107, the device management server 103 acquires transition information in which the agent ID 1002 matches the agent ID of the acquisition request source from the first transition management table 335. Then, the device management server 103 transmits the acquired transition information to the agent 107. The transition information includes a transition destination customer ID and a transition key B. In other words, the device management server 103 responds information about the transition destination customer and the generated one key to a query from the agent 107.

In step S503, upon reception of transition information, the agent 107 stores the transition information, i.e., the transition destination customer ID 1204 and the transition key 1205 in the authentication key/transition information storage unit 811. In the example shown in FIG. 22, when the agent having the belonging customer ID of "BB" and having the agent ID of "ASD" receives transition information having the transition destination customer ID of "AA", the authentication key/transition information storage table is in the state shown in the row 1212 in FIG. 14.

Next, in step S504, a transition request message to the transition destination customer is generated based on the received transition information. The transition request message includes the transition source customer ID and the agent ID of the agent itself. Next, in step S505, the generated transition request message is encrypted with the transition key B received from the device management server 103, and, in step S506, the encrypted transition request message is transmitted to the device management server 103.

Upon reception of the transition request message from the agent 107, the device management server 103 executes transition request acceptance processing so as to judge whether or not the transition request is accepted. When the transition request is accepted, the device management server 103 transmits a transition acceptance message back to the agent 107. Details about the transition request acceptance processing will be described below with reference to FIG. 19. Next, when the agent 107 judges in step S507 that the transition acceptance message has been received from the device management server 103, the processing proceeds to step S508, whereas when the agent 107 judges in step S507 that a transition request acceptance error has been received, the processing proceeds to step S513.

In step S508, the transition acceptance message is decrypted with the transition key B. If the decrypted transition acceptance message is in the predefined format, the transition destination customer is judged to be an authorized customer in step S509, and the processing proceeds to step S510. On the other hand, if the transition acceptance message fails to be decrypted or is not in the predefined format, the transition destination customer is judged to be an unauthorized customer, and the processing proceeds to step S513. In step S510, an authentication key for an agent for the transition destination customer is acquired from the decrypted transition acceptance message and is stored in the post-transition authentication key 1206 of the authentication key/transition information storage unit 811.

Next, in step S511, the agent 107 transmits a successful transition notification to the device management server 103. Successful transition notification reception processing performed by the device management server 103 will be described below with reference to FIG. 20. After the agent 107 transmits the successful transition notification to the device management server 103, the transition processing is executed in step S512. Details of the transition processing will be described below with reference to FIG. 21. If transition has failed, the agent 107 transmits a transition failure notification to the device management server 103 in step S513. Next, in step S514, the agent 107 deletes transition information such as the transition destination customer ID, the transition key B, and the like stored in the authentication key/transition information storage table 811. Thus, the agent 107 ends the transition request processing.

[Transition Request Acceptance Processing in the Device Management Server 103]

Figure 19:
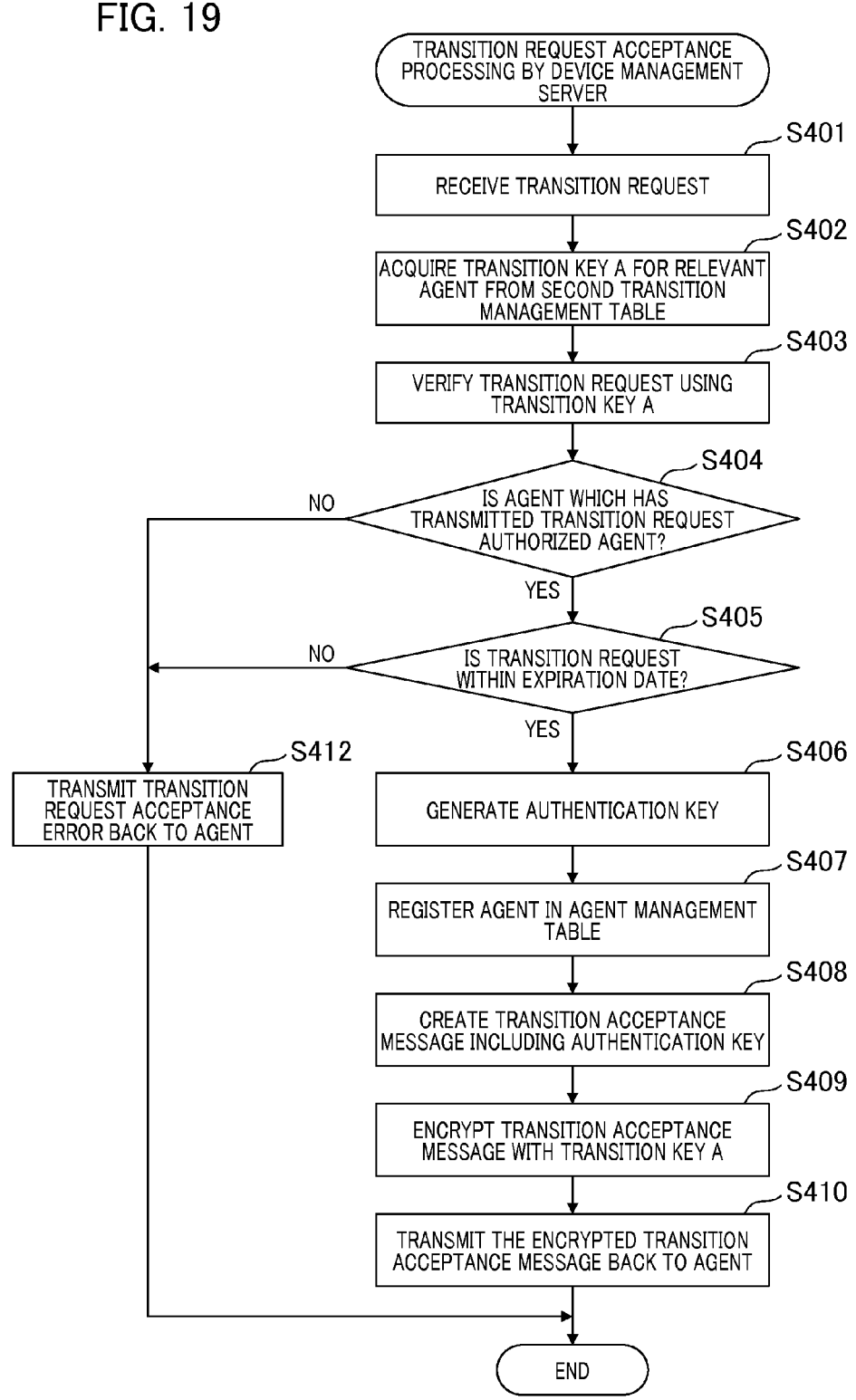
FIG. 19 is a flowchart illustrating the flow of transition request acceptance processing.

A description will be given of the transition request acceptance processing executed by the device management server 103 after reception of the transition request transmitted from the agent 107 in step S506 shown in FIG. 18 with reference to FIG. 19. Firstly, in step S401, upon reception of the transition request transmitted from the agent 107, the device management server 103 acquires the transition destination customer ID, the agent ID, and the encrypted transition request message from the transition request message.

Next, in step S402, the agent management unit 323 acquires the transition key A 1104 for the relevant agent from the second transition management table 336 for the transition destination customer. In step S403, the agent management unit 323 decrypts the encrypted transition request message with the transition key A acquired in step S402. If the decrypted transition request message is in the predefined format and the transition destination customer ID and the agent ID included in the decrypted transition request message match those included in the transition request, the agent targeted for transition is judged to be an authorized agent.

When the agent management unit 323 judges in step S404 that the agent which has transmitted the transition request in step S403 is an authorized agent targeted for transition, the processing proceeds to step S405. On the other hand, if the encrypted transition request message fails to be decrypted or is not in the predefined format, the agent is judged to be an unauthorized agent targeted for transition, and the processing proceeds to step S412.

In step S405, the agent management unit 323 further confirms whether or not the transition request is within a transition expiration date. The transition expiration date is stored in the expiration date 1106 of the second transition management table 336. The transition expiration date is determined by the transition source customer and is transmitted to the transition destination customer. If the current time is before the expiration date 1106, the request is judged to be within the expiration date, and the processing proceeds to step S406. If otherwise, the processing proceeds to step S412.

Next, in step S406, the agent management unit 323 newly generates an authentication key for an agent device targeted for transition in the transition destination customer. In step S407, the agent management unit 323 registers agent information including the generated authentication key as new authentication information in the agent management table 333. For example, when the agent having the agent ID of "ASD" is transitioned to the customer having the customer ID of "AA", agent information is registered as shown in the row 912 in FIG. 11C. The customer ID 901 is set to "AA", the agent ID 902 is set to "ASD", and the authentication key 903 is set to "zse4xdr5" which is the generated authentication key.

Next, in step S408, the agent management unit 323 creates a transition acceptance message including the authentication key. In step S409, the generated transition acceptance message is encrypted with the transition key A. The transition key A is stored in the transition key A 1104 of the second transition management table 336 shown in FIG. 13B, and the transition key A in the row where the agent targeted for transition matches the agent ID 1102 is used. Next, in step S410, the agent management unit 323 transmits the encrypted transition acceptance message back to the agent 107. When the agent is judged to be an unauthorized agent targeted for transition or has expired on the transition expiration date, the agent management unit 323 transmits a transition request acceptance error back to the agent 107 in step S412.

[Successful Transition Notification Reception Processing Performed by the Device Management Server 103]

Figure 20:
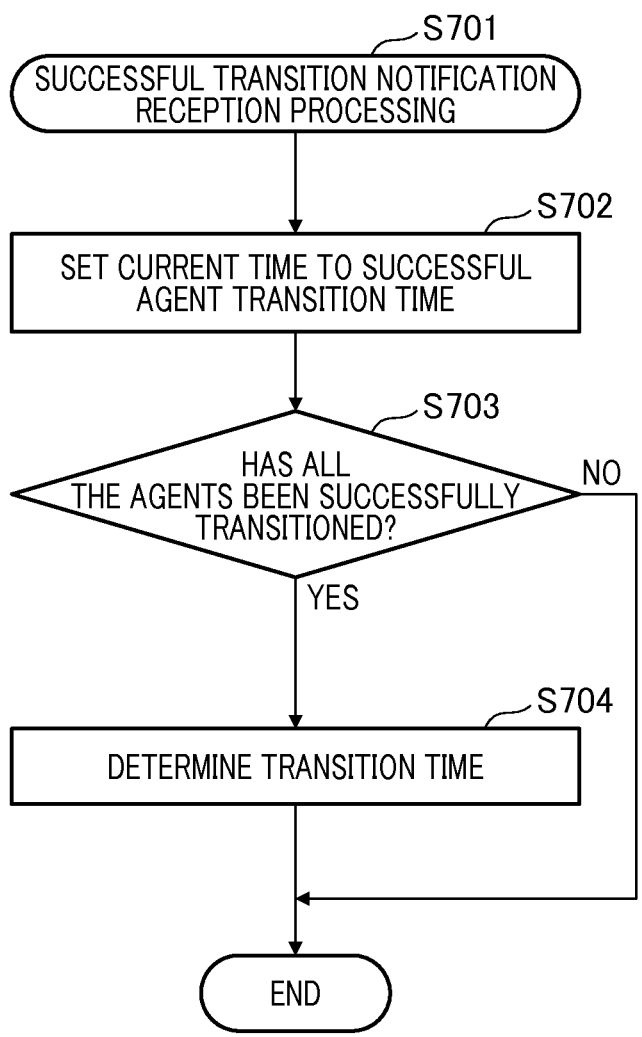
FIG. 20 is a flowchart illustrating the flow of successful transition notification reception processing.

Next, a description will be given of the successful transition notification reception processing executed by the device management server 103 after reception of a successful transition notification transmitted from the agent in step S511 shown in FIG. 18 by the agent management unit 323 of the device management server 103 with reference to FIG. 20. Firstly, upon reception of a successful transition notification from the agent 107 in step S701, the device management server 103 sets a current time to the successful transition time 1007 in the row of the relevant agent in the first transition management table 335 for the relevant transition source customer in step S702.

Next, in step S702, the device management server 103 judges whether or not all the agents requested for transition have been successfully transitioned. When the successful transition times 1007 in all the rows in the first transition management table 335 are set, it is meant that all the agents have been successfully transitioned. If all the agents have been successfully transitioned, the processing proceeds to step S704, whereas if there are some agents of which transition is not successful, the processing ends.

In step S704, the device management server 103 determines a transition time, and sets the transition time to the transition time 1008 in the first transition management table 335. The transition time can be determined depending on the transition time acquisition interval upon the transition processing by the agent 107. For example, if the agent 107 acquires a transition time once per day, the transition time can be set to one day after the day of the current time at the shortest.

[Transition Processing Performed by the Agent 107]

Figure 21:
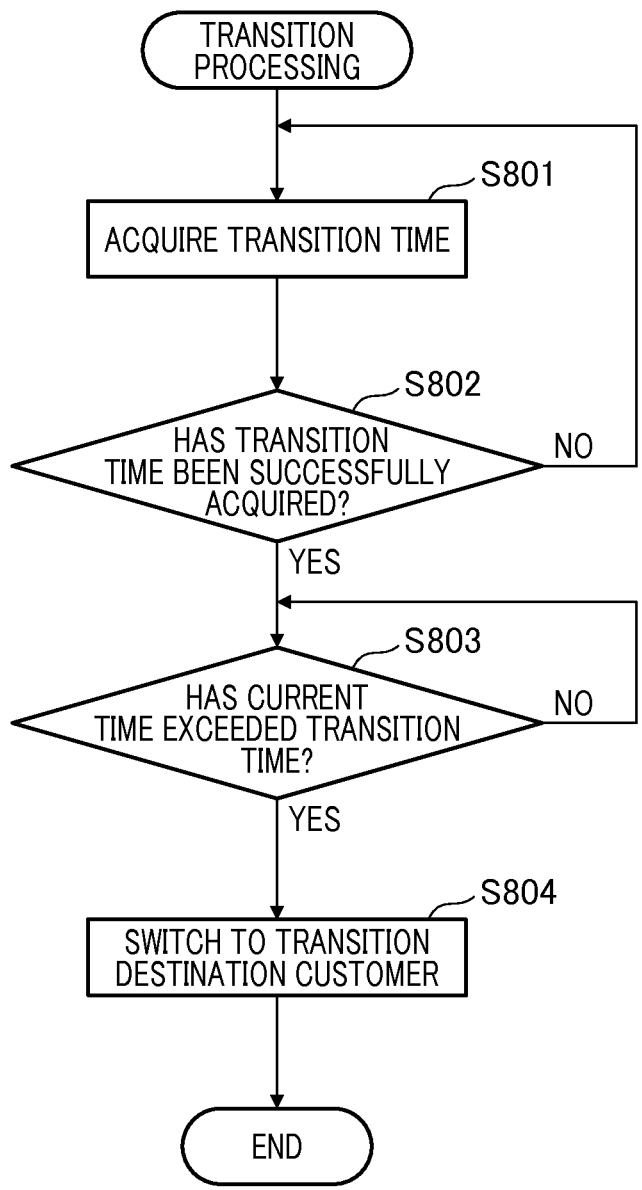
FIG. 21 is a flowchart illustrating the flow of transition processing to be processed by the agent.

A description will be given of the transition processing executed by the agent control unit 803 of the agent 107 in step S512 shown in FIG. 18 with reference to FIG. 21. Firstly, in step S801, the agent control unit 803 requests a transition time from the device management server 103. The device management server 103 acquires a transition time for the agent targeted for transition from the transition time 1008 in the first transition management table 335, and then transmits the transition time back to the agent 107. When a transition request is made for a plurality of agents 107, the transition time is set if a successful transition notification has been sent from all the agents 107, whereas the transition time is not set if a successful transition notification has not been sent from at least one of the agents 107.

The agent 107 judges in step S802 whether or not the transition time has been acquired. If the transition time has been acquired, the processing proceeds to step S803, whereas if the transition time could not be acquired, the processing proceeds to step S801 again after a predetermined interval to acquire the transition time.

Next, if the transition time is acquired, the agent 107 judges in step S803 whether or not the current time exceeds the transition time. If the current time does not exceed the transition time, judgment is made again in step S803 after waiting for a predetermined time. If the current time exceeds the transition time, in step S804, the transmission destination to which device information, job history, and the like are transmitted is switched to the transition destination customer. Here, the belonging customer ID 1201 stored in the authentication key/transition information storage unit 811 is replaced with the customer ID stored in the transition destination customer ID 1204, and the authentication key 1203 is replaced with the authentication key stored in the post-transition authentication key 1206. Furthermore, the agent 107 deletes data such as the transition destination customer ID 1204, the transition key B 1205, the post-transition authentication key 1206, and the transition date and time 1207. The processing enables the connection destination to which the agent 107 is connected to be switched to the transition destination customer. In the flow, the connection destination is switched to the transition destination customer when the current time exceeds the transition time, and then old authentication information is deleted. However, in order to ensure successful transition, after the connection destination is switched to the transition destination customer, the agent 107 may also attempt communication with the device management server 103 using a new authentication key so as to judge whether or not communication is possible.

As described above, the network system of the present invention can realize safe transition between agent's customers only when the user specifies the transition destination to the device management server without operating the device management agent which is in a customer's network environment.

Second Embodiment

In the first embodiment, the device management server 103 generates a transition key A and a transition key B at an occurrence of transition request (step S302), and transmits the transition key A and the transition key B to the transition destination customer and the agent targeted for transition. In the second embodiment, the authentication key for the agent targeted for transition is used as the transition key A and the transition key B. The device management server 103 transmits the authentication key for the agent targeted for transition as the transition key A to the transition destination customer (steps S303 and S304), and then stores the authentication key in the transition key A 1104 in the agent acceptance management table 336 (step S306).

Since the agent targeted for transition holds the authentication key, there is no need to transmit the transition key B to the transition destination customer, but the transition key B may also be transmitted thereto (step S501). Upon encryption of the transition request message in step S505 of the transition request processing (FIG. 18), the agent 107 uses the authentication key 1203 instead of the transition key B. Upon decryption of the transition acceptance message in step S508, the agent 107 uses the authentication key 1203 for verification. The authentication key for the agent targeted for transition stored instead of the transition key A is used in steps S402 and S409 of the transition request acceptance processing (FIG. 18) for the transition destination customer by the agent management unit 323 of the device management server 103.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-202264, filed on Sep. 27, 2013, which is hereby incorporated by reference herein in its entirety.

What is claimed is:

1. A network system comprising:
a management server system that manages a plurality of network devices; and
an agent device that is provided in a site network including the plurality of network devices and communicates with the management server system,
wherein the management server system comprises:
a first processor; and
a first memory including first instructions that, when executed by the first processor, cause the first processor to:
manage identification information about the agent device and current authentication information for communication between the management server system and the agent device by associating the identification information and the current authentication information with a first tenant;
accept a transition instruction for transition from the first tenant to a second tenant of the agent device;
generate symmetric keys including a first key and a second key in accordance with the accepted transition instruction, wherein information, including the generated first key and the identification information about the agent device, is managed in association with the second tenant serving as a transition destination;
transmit, in response to a query from the agent device, a response including information about the second tenant serving as the transition destination and the generated second key;
upon reception of a transition request for transition to the second tenant, verify first signature information included in the transition request using the first key which is managed in association with the second tenant;
upon successful verification of the first signature information, transmit, to the agent device, new authentication information for communication between the management server system and the agent device;
delete the identification information about the agent device and the current authentication information associated with the first tenant in response to receipt of a successful transition notification from the agent device, and
wherein the agent device comprises:
a second processor; and
a second memory including second instructions that, when executed by the second processor, cause the second processor to:
send the query to the management server system;
receive the response based on the query; and
transmit, to the management server system, a transition request for transition to the second tenant, the transition request including second signature information using the second key included in the response.

2. The network system according to claim 1, wherein the first instructions, when executed by the first processor, further cause the first processor to encrypt the new authentication information using the first key, and then transmit the encrypted new authentication information to the agent device.

3. The network system according to claim 1, wherein the first instructions, when executed by the first processor, further cause the first processor to generate the symmetric keys with an expiration date.

4. The network system according to claim 1, wherein the second instructions, when executed by the second processor, further cause the second processor to judge whether or not the agent device is capable of communicating with the management server system using the new authentication information.

5. The network system according to claim 1, wherein the first instructions, when executed by the first processor, further cause the first processor to, upon successful verification of the second signature information, associate the identification information about the agent device and the new authentication information generated for the agent device with the second tenant.

6. The network system according to claim 1, wherein the second instructions, when executed by the second processor, further cause the second processor to store, in association with the second tenant, new authentication information that has been transmitted from the management server system in accordance with successful verification of the second signature information.

7. The network system according to claim 6, wherein the second instructions, when executed by the second processor, further cause the second processor to decrypt the new authentication information encrypted and transmitted to the agent device using the second key included in the response, and then store the decrypted new authentication information.

8. The network system according to claim 1, wherein the first instructions, when executed by the first processor, further cause the first processor to determine a date and time at which transition is performed after reception of the successful transition notification from all the agent devices.

9. The network system according to claim 8, wherein the second instructions, when executed by the second processor, further cause the second processor to perform a transition to the second tenant by acquiring the determined date and time, and communication between the agent device which has been transitioned to the second tenant and the management server system is performed using the new authentication information.

10. A management server system that manages a plurality of network devices via an agent device which is provided in a site network including the plurality of network devices, the management server system comprising:

a processor; and a memory storing instructions that, when executed by the processor, cause the processor to:

manage identification information about the agent device and current authentication information for communication between the management server system and the agent device by associating the identification information and the current authentication information with a first tenant;

accept a transition instruction for transition from the first tenant to a second tenant of the agent device;

generate symmetric keys including a first key and a second key in accordance with the accepted transition instruction, wherein information, including the generated first key and the identification information about the agent device, is managed in association with the second tenant serving as a transition destination;

transmit, in response to a query from the agent device, a response including information about the second tenant serving as the transition destination and the generated second key;

upon reception of a transition request for transition to the second tenant, verify signature information included in the transition request using the first key which is managed in association with the second tenant;

upon successful verification of the signature information, transmit, to the agent device, new authentication information for communication between the management server system and the agent device; and delete the identification information about the agent device and the current authentication information associated with the first tenant in response to receipt of a successful transition notification from the agent device, wherein communication between the management server system and the agent device which has been transitioned to the second tenant is performed using the new authentication information.

11. A non-transitory computer-readable storage medium having stored thereon a computer program that, when executed by a processor, causes the processor to function as the management server system according to claim 10.

12. A control method for controlling a management server system that manages a plurality of network devices via an agent device which is provided in a site network including the plurality of network devices, the control method comprising:

managing identification information about the agent device and current authentication information for communication between the management server system and the agent device by associating the identification information and the current authentication information with a first tenant;

accepting a transition instruction for transition from the first tenant to a second tenant of the agent device;

generating symmetric keys including a first key and a second key in accordance with the accepted transition instruction, wherein information, including the generated first key and the identification information about the agent device, is managed in association with the second tenant serving as a transition destination;

transmitting, in response to a query from the agent device, a response including information about the second tenant serving as the transition destination and the generated second key;

verifying, upon reception of a transition request for transition to the second tenant, signature information included in the transition request using the first key which is managed in association with the second tenant;

transmitting to the agent device, upon successful verification of the signature information, new authentication information for communication between the management server system and the agent device; and deleting the identification information about the agent device and the current authentication information associated with the first tenant in response to receipt of a successful transition notification from the agent device, wherein communication between the management server system and the agent device which has been transitioned to the second tenant is performed using the new authentication information.

* * * * *